(12) United States Patent
Asterjadhi et al.

(10) Patent No.: US 8,902,803 B2
(45) Date of Patent: Dec. 2, 2014

(54) SYSTEMS AND METHODS FOR REDUCING COLLISIONS AFTER TRAFFIC INDICATION MAP PAGING

(71) Applicant: QUALCOMM Incorporated, San Diego, CA (US)

(72) Inventors: Alfred Asterjadhi, Breukelen (NL); Simone Merlin, San Diego, CA (US); Maarten Menzo Wentink, Breukelen (NL); Santosh Paul Abraham, San Diego, CA (US); Zhi Quan, Livermore, CA (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 13/747,759

(22) Filed: Jan. 23, 2013

(65) Prior Publication Data

US 2013/0229963 A1 Sep. 5, 2013

Related U.S. Application Data

(60) Provisional application No. 61/606,871, filed on Mar. 5, 2012, provisional application No. 61/615,713, filed on Mar. 26, 2012, provisional application No. 61/636,689, filed on Apr. 22, 2012.

(51) Int. Cl.
| | | |
|---|---|---|
| G08C 17/00 | (2006.01) | |
| H04W 52/02 | (2009.01) | |
| H04W 68/02 | (2009.01) | |
| H04W 72/08 | (2009.01) | |
| H04W 28/04 | (2009.01) | |
| H04W 76/04 | (2009.01) | |
| H04W 74/08 | (2009.01) | |

(52) U.S. Cl.
CPC .......... *H04W 28/044* (2013.01); *H04W 76/048* (2013.01); *H04W 52/0216* (2013.01); *H04W 74/085* (2013.01); *H04W 68/025* (2013.01)
USPC ........................................ 370/311; 455/343.2

(58) Field of Classification Search
None
See application file for complete search history.

(56) References Cited

U.S. PATENT DOCUMENTS

| | | |
|---|---|---|
| 6,289,227 B1 | 9/2001 | Shi |
| 6,721,805 B1 | 4/2004 | Bhagwat et al. |
| 7,130,668 B2 | 10/2006 | Chang et al. |
| 7,711,377 B2 | 5/2010 | Laroia et al. |
| 8,060,054 B1 | 11/2011 | Dinan et al. |

(Continued)

FOREIGN PATENT DOCUMENTS

WO   WO-0010353 A1   2/2000

OTHER PUBLICATIONS

International Search Report and Written Opinion—PCT/US2013/029162—ISA/EPO—Sep. 4, 2013.

(Continued)

*Primary Examiner* — Jianye Wu
(74) *Attorney, Agent, or Firm* — James K. O'Hare

(57) ABSTRACT

Systems, methods, and devices for reducing collisions in a wireless communications network are described herein. In some aspects, a receiver receives a paging message. The paging message includes an ordering and a multiplier. A processor determines a first wake-up time based on the ordering and the multiplier. The wireless device wakes up at the determined wake-up time. The wireless device receives data via the receiver.

72 Claims, 9 Drawing Sheets

(56) References Cited

U.S. PATENT DOCUMENTS

| | | |
|---|---|---|
| 2004/0198302 A1 | 10/2004 | Hutchison et al. |
| 2006/0025180 A1 | 2/2006 | Rajkotia et al. |
| 2006/0072614 A1 | 4/2006 | Ogiso et al. |
| 2006/0194624 A1 | 8/2006 | Hsieh et al. |
| 2007/0184866 A1 | 8/2007 | Kim et al. |
| 2008/0032662 A1* | 2/2008 | Tu ............................. 455/343.1 |
| 2010/0002665 A1* | 1/2010 | Oguchi ........................ 370/338 |
| 2011/0058510 A1 | 3/2011 | Thomas et al. |
| 2011/0096709 A1 | 4/2011 | Jeyaseelan |
| 2011/0163847 A1 | 7/2011 | Park et al. |
| 2011/0173464 A1 | 7/2011 | Prakash et al. |
| 2011/0199905 A1* | 8/2011 | Pinheiro et al. ............... 370/235 |
| 2011/0274040 A1* | 11/2011 | Pani et al. ..................... 370/328 |

OTHER PUBLICATIONS

Partial International Search Report—PCT/US2013/029162—ISA/EPO—Jun. 26, 2013.

* cited by examiner

SYSTEMS AND METHODS FOR REDUCING COLLISIONS AFTER TRAFFIC INDICATION MAP PAGING

BACKGROUND

1. Field

The present application relates generally to wireless communications, and more specifically to systems, methods, and devices for performing collision avoidance in a wireless communication network.

2. Background

In many telecommunication systems, communications networks are used to exchange messages among several interacting spatially-separated devices. Networks can be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network can transmit/receive information between each other. Further, devices that are not actively transmitting/receiving information in the wireless network can enter a doze state to conserve power, where the devices do not actively transmit/receive information in the doze state. These devices can further utilize paging messages to determine when to wake up from a doze state and enter an awake state in order to transmit/receive data. Thus, improved systems, methods, and devices for reducing collisions are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved paging for devices in a wireless network.

One aspect of this disclosure provides a method for reducing collisions in a wireless communications network. The method includes receiving, at a wireless device, a paging message. The paging message includes an ordering and a multiplier. The method further includes determining a first wake-up time based on the ordering and the multiplier. The method further includes waking up at the determined wake-up time. The method further includes receiving data.

In an embodiment, the method can further include transmitting a request for the data. The method can further include determining a second wake-up time. The method can further include waking up at the determined second wake-up time. The method can further include receiving an acknowledgement to the request for data. The second wake-up time can be earlier than the first wake-up time.

Another aspect of this disclosure provides a wireless device configured to reduce collisions in a wireless communications network. The wireless device includes a receiver configured to receive a paging message. The paging message includes an ordering and a multiplier. The wireless device further includes a processor configured to determine a first wake-up time based on the ordering and the multiplier. The processor is further configured to wake up at the determined wake-up time. The processor is further configured to receive data.

In an embodiment, the wireless device can further include a transmitter configured to transmit a request for the data. The processor can be further configured to determine a second wake-up time. The processor can be further configured to wake up at the determined second wake-up time. The receiver can be further configured to receive an acknowledgement to the request for data. The second wake-up time can be earlier than the first wake-up time.

Another aspect of this disclosure provides an apparatus for reducing collisions in a wireless communications network. The apparatus includes means for receiving a paging message. The paging message includes an ordering and a multiplier. The apparatus further includes means for determining a first wake-up time based on the ordering and the multiplier. The apparatus further includes means for waking up at the determined wake-up time. The apparatus further includes means for receiving data.

In an embodiment, the apparatus can further include means for transmitting a request for the data. The apparatus can further include means for determining a second wake-up time. The apparatus can further include means for waking up at the determined second wake-up time. The apparatus can further include means for receiving an acknowledgement to the request for data. The second wake-up time can be earlier than the first wake-up time.

Another aspect of this disclosure provides a non-transitory computer-readable medium. The medium includes code that, when executed by one or more processors, causes an apparatus to receive a paging message. The paging message includes an ordering and a multiplier. The medium further includes code that, when executed by one or more processors, causes the apparatus to determine a first wake-up time based on the ordering and the multiplier. The medium further includes code that, when executed by one or more processors, causes the apparatus to wake up at the determined wake-up time. The medium further includes code that, when executed by one or more processors, causes the apparatus to receive data.

In an embodiment, the medium can further include code that, when executed by one or more processors, causes the apparatus to transmit a request for the data. The medium can further include code that, when executed by one or more processors, causes the apparatus to determine a second wake-up time. The medium can further include code that, when executed by one or more processors, causes the apparatus to wake up at the determined second wake-up time. The medium can further include code that, when executed by one or more processors, causes the apparatus to receive an acknowledgement to the request for data. The second wake-up time can be earlier than the first wake-up time.

Another aspect of this disclosure provides a method for reducing collisions in a wireless communications network. The method includes transmitting, at a wireless device, an advertisement of an extended sleep mode. The method further includes sleeping through one or more paging messages of an access point. The method further includes transmitting a request for data. The method further includes receiving data.

Another aspect of this disclosure provides a wireless device for reducing collisions in a wireless communications network. The device includes a transmitter configured to transmit an advertisement of an extended sleep mode. The device further includes a processor configured to sleep through one or more paging messages of an access point. The transmitter is further configured to transmit a request for data. The device further includes a receiver configured to receive data.

Another aspect of this disclosure provides an apparatus for reducing collisions in a wireless communications network. The apparatus includes means for transmitting an advertisement of an extended sleep mode. The apparatus further includes means for sleeping through one or more paging messages of an access point. The apparatus further includes means for transmitting a request for data. The apparatus further includes means for receiving data.

Another aspect of this disclosure provides a non-transitory computer-readable medium. The medium includes code that, when executed by one or more processors, causes an apparatus to transmit an advertisement of an extended sleep mode. The medium further includes code that, when executed by one or more processors, causes the apparatus to sleep through one or more paging messages of an access point. The medium further includes code that, when executed by one or more processors, causes the apparatus to transmit a request for data. The medium further includes code that, when executed by one or more processors, causes the apparatus to receive data.

DETAILED DESCRIPTION

Figure 1:
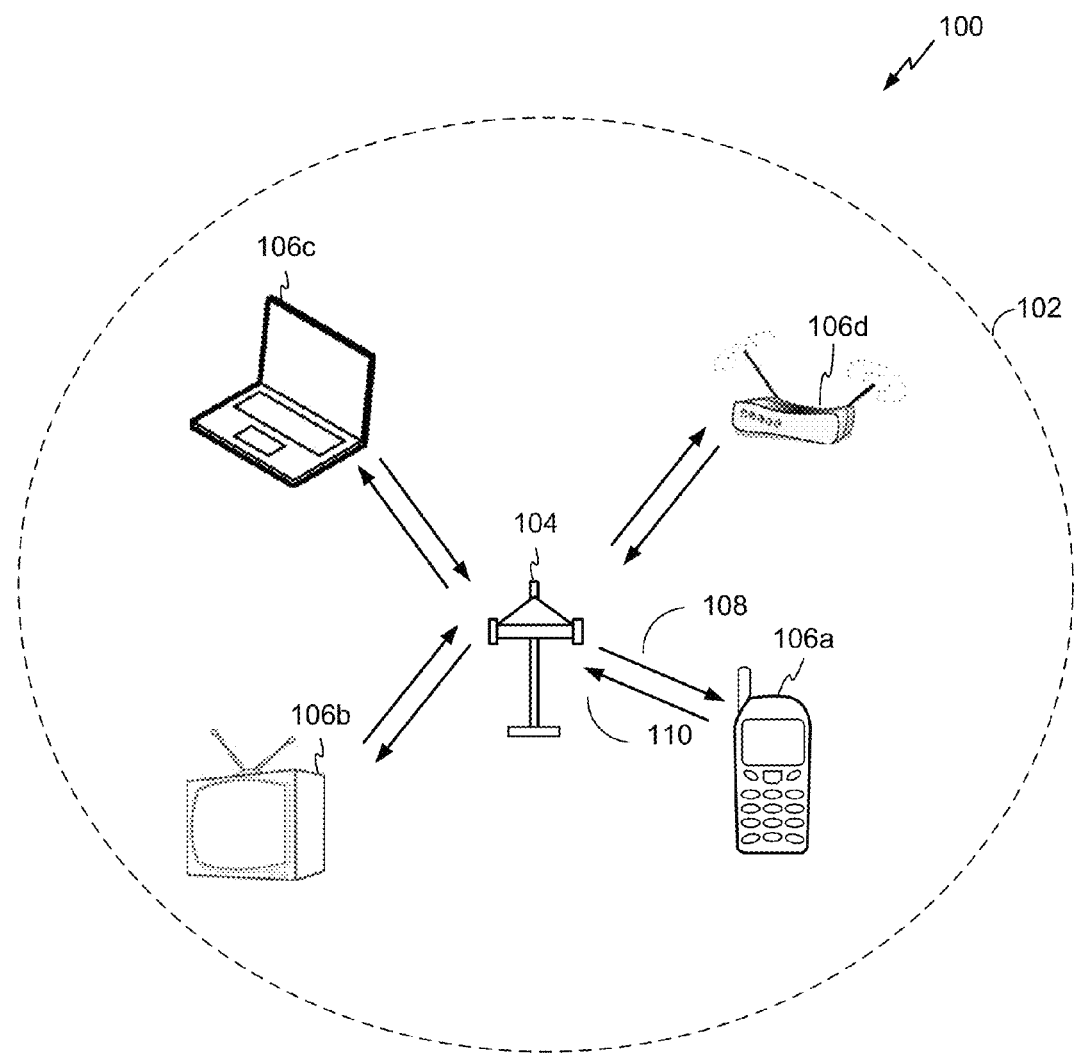
FIG. 1 shows an exemplary wireless communication system in which aspects of the present disclosure can be employed.

Various aspects of the novel systems, apparatuses, and methods are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies can include various types of wireless local area networks (WLANs). A WLAN can be used to interconnect nearby devices together, employing widely used networking protocols. The various aspects described herein can apply to any communication standard, such as a wireless protocol.

In some aspects, wireless signals in a sub-gigahertz band can be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol can be used for sensors, metering, and smart grid networks. Advantageously, aspects of certain devices implementing the 802.11ah protocol can consume less power than devices implementing other wireless protocols, and/or can be used to transmit wireless signals across a relatively long range, for example about one kilometer or longer.

In some implementations, a WLAN includes various devices which are the components that access the wireless network. For example, there can be two types of devices: access points ("APs") and clients (also referred to as stations, or "STAB"). In general, an AP can serve as a hub or base station for the WLAN and an STA serves as a user of the WLAN. For example, an STA can be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA can also be used as an AP.

An access point ("AP") can also include, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" can also include, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal can include a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein can implement the 802.11ah standard, for example. Such devices, whether used as an STA or AP or other device, can be used for smart metering or in a smart grid network. Such devices can provide sensor applications or be used in home automation. The devices can instead or in addition be used in a healthcare context, for example for personal healthcare. They can also be used for surveillance, to enable extended-range Internet connectivity (e.g., for use with hotspots), or to implement machine-to-machine communications.

FIG. 1 shows an exemplary wireless communication system 100 in which aspects of the present disclosure can be employed. The wireless communication system 100 can operate pursuant to a wireless standard, for example the 802.11ah standard. The wireless communication system 100 can include an AP 104, which communicates with STAs 106.

A variety of processes and methods can be used for transmissions in the wireless communication system 100 between the AP 104 and the STAs 106. For example, signals can be sent and received between the AP 104 and the STAs 106 in accordance with OFDM/OFDMA techniques. If this is the case, the wireless communication system 100 can be referred to as an OFDM/OFDMA system. Alternatively, signals can be sent and received between the AP 104 and the STAs 106 in accordance with CDMA techniques. If this is the case, the wireless communication system 100 can be referred to as a CDMA system.

A communication link that facilitates transmission from the AP 104 to one or more of the STAs 106 can be referred to as a downlink (DL) 108, and a communication link that facilitates transmission from one or more of the STAs 106 to the AP 104 can be referred to as an uplink (UL) 110. Alternatively, a downlink 108 can be referred to as a forward link or a forward channel, and an uplink 110 can be referred to as a reverse link or a reverse channel.

The AP 104 can act as a base station and provide wireless communication coverage in a basic service area (BSA) 102. The AP 104 along with the STAs 106 associated with the AP 104 and that use the AP 104 for communication can be referred to as a basic service set (BSS). It should be noted that the wireless communication system 100 may not have a central AP 104, but rather can function as a peer-to-peer network between the STAs 106. Accordingly, the functions of the AP 104 described herein can alternatively be performed by one or more of the STAs 106.

The AP 104 can transmit a beacon signal (or simply a "beacon"), via a communication link such as the downlink 108, to other nodes STAs 106 of the system 100, which can help the other nodes STAs 106 to synchronize their timing with the AP 104, or which can provide other information or functionality. Such beacons can be transmitted periodically. In one aspect, the period between successive transmissions can be referred to as a superframe. Transmission of a beacon can be divided into a number of groups or intervals. In one aspect, the beacon can include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon can include information both common (e.g., shared) amongst several devices, and information specific to a given device.

In some aspects, a STA 106 can be required to associate with the AP 104 in order to send communications to and/or receive communications from the AP 104. In one aspect, information for associating is included in a beacon broadcast by the AP 104. To receive such a beacon, the STA 106 can, for example, perform a broad coverage search over a coverage region. A search can also be performed by the STA 106 by sweeping a coverage region in a lighthouse fashion, for example. After receiving the information for associating, the STA 106 can transmit a reference signal, such as an association probe or request, to the AP 104. In some aspects, the AP 104 can use backhaul services, for example, to communicate with a larger network, such as the Internet or a public switched telephone network (PSTN).

Figure 2:
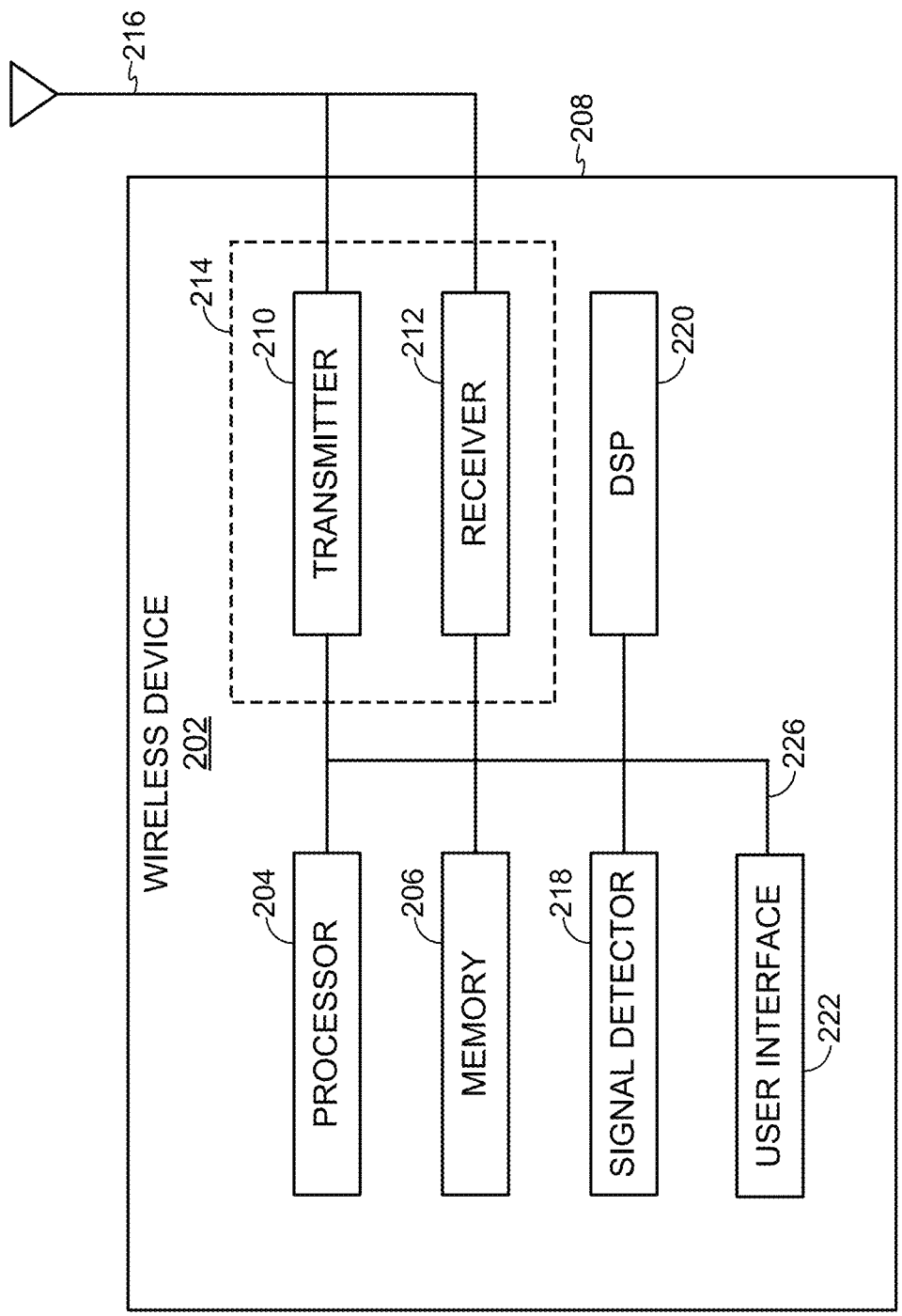
FIG. 2 shows a functional block diagram of an exemplary wireless device that can be employed within the wireless communication system of FIG. 1.

FIG. 2 shows an exemplary functional block diagram of a wireless device 202 that can be employed within the wireless communication system 100 of FIG. 1. The wireless device 202 is an example of a device that can be configured to implement the various methods described herein. For example, the wireless device 202 can include the AP 104 or one of the STAs 106.

The wireless device 202 can include a processor 204 which controls operation of the wireless device 202. The processor 204 can also be referred to as a central processing unit (CPU). Memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can include or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and/or a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas.

The transmitter 210 can be configured to wirelessly transmit messages, which can be referred to as "paging messages" that are configured to indicate to wireless devices whether or not the wireless devices need to wake up from a doze state and enter an awake state as discussed below. For example, the transmitter 210 can be configured to transmit paging messages generated by the processor 204, discussed above. When the wireless device 202 is implemented or used as a STA 106, the processor 204 can be configured to process paging messages. When the wireless device 202 is implemented or used as an AP 104, the processor 204 can also be configured to generate paging messages.

The receiver 212 can be configured to wirelessly receive paging messages. When the wireless device 202 is implemented or used as a STA 106, the transmitter 210 can be configured to transmit requests for data in response to the paging messages. For example, the wireless device 202 can be configured to transmit a Power-Saving Poll (PS-Poll) as will be described herein with respect to FIG. 4. When the wireless device 202 is implemented or used as an AP 104, the transmitter 210 can be further configured to transmit data to the one or more STAs 106. When the wireless device 202 is implemented or used as a STA 106, the transmitter 210 can be configured to transmit an acknowledgement to the data received from the AP 104.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a packet for transmission. In some aspects, the packet can include a physical layer data unit (PPDU).

The wireless device 202 can further include a user interface 222 in some aspects. The user interface 222 can include a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. Those of skill in the art will appreciate the components of the wireless device 202 can be coupled together or accept or provide inputs to each other using some other mechanism.

Although a number of separate components are illustrated in FIG. 2, those of skill in the art will recognize that one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

The wireless device 202 can include an AP 104 or an STA 106, and can be used to transmit and/or receive communications including paging messages. That is, either AP 104 or STA 106 can serve as transmitter or receiver devices of paging messages. Certain aspects contemplate signal detector 218 being used by software running on memory 206 and processor 204 to detect the presence of a transmitter or receiver.

The STA 106 can have a plurality of operational modes. For example, the STA 106 can have a first operational mode referred to as an active mode. In the active mode, the STA 106 can always be in an "awake" state and actively transmit/receive data with the AP 104. Further, the STA 106 can have a second operational mode referred to as a power save mode. In the power save mode, the STA 106 can be in the "awake" state or a "doze" or "sleep" state where the STA 106 does not actively transmit/receive data with the AP 104. For example, the receiver 212 and possibly DSP 220 and signal detector 218 of the STA 106 can operate using reduced power consumption in the doze state. Further, in the power save mode, the STA 106 can occasionally enter the awake state to listen to messages from the AP 104 (e.g., paging messages) that indicate to the STA 106 whether or not the STA 106 needs to "wake up" (e.g., enter the awake state) at a certain time so as to be able to transmit/receive data with the AP 104.

Accordingly, in certain wireless communication systems 100, the AP 104 can transmit paging messages to a plurality of STAs 106 in a power save mode in the same network as the AP 104, indicating whether or not there is data buffered at the AP 104 for the STAs 106. The STAs 106 can also use this information to determine whether they need to be in an awake state or a doze state. For example, if an STA 106 determines it is not being paged, it can enter a doze state. Alternatively, if the STA 106 determines it can be paged, the STA 106 can enter an awake state for a certain period of time to receive the page and further determine when to be in an awake state based on the page. Further, the STA 106 can stay in the awake state for a certain period of time after receiving the page. In another example, the STA 106 can be configured to function in other ways when being paged or not being paged that are consistent with this disclosure.

In some aspects, paging messages can include a bitmap (not shown in this figure), such as a traffic identification map (TIM). In certain such aspects, the bitmap can include a number of bits. These paging messages can be sent from the AP 104 to STAs 106 in a beacon or a TIM frame. Each bit in the bitmap can correspond to a particular STA 106 of a plurality of STAs 106, and the value of each bit (e.g., 0 or 1) can indicate the state the corresponding STA 106 should be in (e.g., doze state or awake state) to be able to receive Buffed Units that the AP 104 has for that particular STA. Accordingly, the size of the bitmap can be directly proportional to the number of STAs 106 in the wireless communications system 100. Therefore, a large number of STAs 106 in the wireless communications system 100 can result in a large bitmap.

In some aspects, STAs 106 that sleep for a long time may not wake up to read any TIM messages. For example, a STA 106 can decide to sleep through one or more TIM messages in an extended sleep mode. In this case, the STA 106 can advertise to the AP 104 that the STA 106 may not read any TIM messages. Accordingly, the AP 104 may not include the corresponding identifiers in the TIM message. In various embodiments, the STAs 106 may notify the AP 104 that they may not wake up for one or more TIM messages (i.e., that they are operating in the aforementioned power saving mode) using a control message, or immediately during association.

For STAs 106 that have notified the AP 104 in this manner, the AP 104 may not include identifiers in the TIM message, even when it has BUs intended for them. STAs 106 can claim their BUs by sending a PS-Poll at any time to the AP 104. In an embodiment, AP 104 can immediately send the BU in response to the PS-Poll. In another embodiment, the AP 104 can respond to the PS-Poll with an ACK, and deliver the BU at a later time. In yet another embodiment, the AP 104 may not immediately respond (neither with ACK nor with BU) to a PS-Poll. The AP 104 can instead reply with a Cumulative ACK frame sent after a given scheduled time after the TIM message.

In various embodiments, the STA 106 can specify the waiting time to deliver the BU via the PS-Poll (for a dynamic indication), an association request, a probe request, and/or another management frame sent to the AP (for a static indication). In other embodiments, the AP 104 can specify the waiting time to deliver the BU via an ACK frame, a TIM element (for a dynamic indication), a beacon, an association response, a probe response, or other management frames sent to the STA 106 (for a static indication). The STA 106 can go to sleep for the waiting time duration. The STA 106 can acknowledge correct reception of the BU by sending an ACK. The STA 106 can then go back to sleep.

Figure 3:
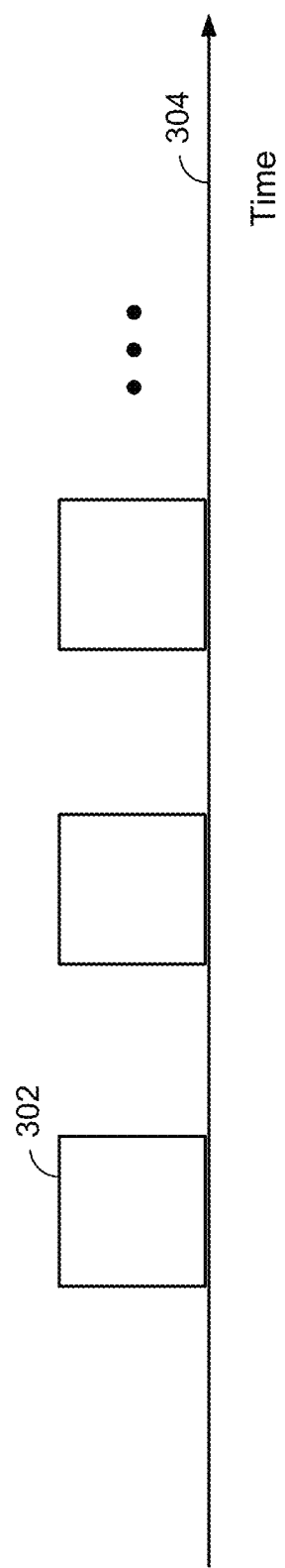
FIG. 3 illustrates a plurality of partitioned paging messages transmitted by an access point to wireless stations in the wireless communication system of FIG. 1.

FIG. 3 illustrates a plurality of partitioned paging messages 302 transmitted by the AP 104 to STAs 106 in the wireless communication system 100 of FIG. 1. As shown, time increases horizontally across the page over the time axis 304. As shown, the AP 104 is configured to transmit a plurality of paging messages 302. The paging messages 302 can be sent in a TIM frame, a beacon, or using some other appropriate signaling. The STAs 106 can be configured to listen to one or more of the paging messages 302. Following the one or more paging messages 302, the STAs 106 can be configured to transmit requests to the AP 104 and receive a response from the AP 104.

The paging process can result in a high number of STAs 106 receiving the one or more paging messages 302. For example, a high number of STAs 106 in the same TIM can receive the one or more paging messages 302, which can lead to one or more STAs 106 contending to transmit requests to the AP 104 on the medium after the TIM. Accordingly, collisions resulting in corrupted data received by the AP 104 can occur in situations in which at least two STAs 106 attempt to transmit requests to the AP 104 at or nearly at a same time.

Figure 4:
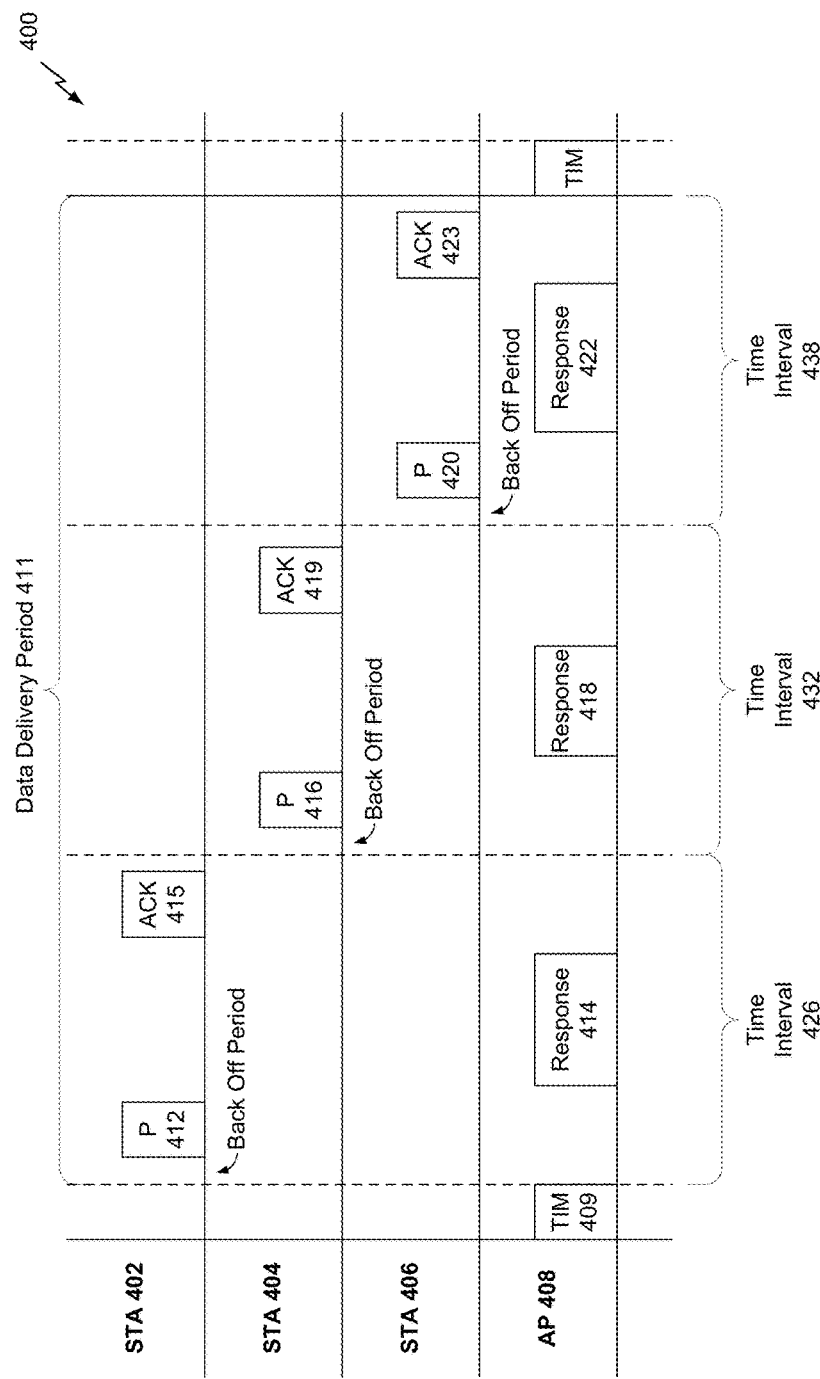
FIG. 4 illustrates an exemplary polling request mechanism.

FIG. 4 illustrates a polling request mechanism 400. The polling request mechanism 400 shown can be used by the AP 104 and the STAs 106 in the wireless communication system 100 of FIG. 1. As shown, time increases horizontally across the page from time interval 426 to the time interval 438. In an embodiment, the data delivery period can last for an integer multiple of time units (TUs). In an embodiment, each TU can be sufficiently long to allow the STAs 402, 404, and 406 to perform back-off, send PS-Poll, receive data and send an acknowledgement (ACK) to the AP 408. In one embodiment the AP 408 can include the TU duration in a TIM frame 409. The calculation of the TU by the AP 408 can take into account information regarding the Buffered Units (BUs) that the AP 408 has to send to the paged STAs 402, 404, and 406. In one embodiment, the TU duration can account for the time to allow the correct transmission of the longest possible BU to the intended paged STAs 402, 404, and 406. In another embodiment, the TU can be the ratio between the time during two consecutive TIM frames and the number of STAs indicated in the first TIM map. In another embodiment, the TU can be the ratio between a data delivery period and a number of stations indicated in the TIM frame.

In general, after the transmission of a paging message, such as TIM 409, a time interval is reserved for the paged STAs 106. The reservation can be achieved by transmitting a message (e.g., paging message, additional message) to cause non-paged STAs to defer access to the medium for the duration of the reserved period. In some implementations, the deferred access can be achieved by setting a duration field value of a reserving frame so that non-paged STAs can set their network allocation vector (NAV). In other implementations, the deferred access can be achieved by sending an additional frame preceding or following the paging frame, where the additional frame indicates the duration of the reserved period. In an embodiment, the deferred access period can be the data delivery period 411.

In some embodiments, one or more STAs 106 can ignore the NAV set during the contention period. For example, STAs 106 may be paged by the AP 104, as indicated in the TIM 409. Paged STAs 106 may ignore the previously set NAV. In an embodiment, ignoring the NAV can be based on an indication in the TIM 409 paging. When STAs 106 ignore the NAV, they can access the wireless medium, for example, to transmit PS-Poll requests. In other words, STAs 106 can refrain from obeying the NAV.

During the reserved time interval, the paged STAs 106 can send requests to the AP 104 (e.g., Power Saving polls (PS-Poll) requests 412, 416, and 420) and receive a response from the AP 104 (e.g., response 414, 418, and 422). The STAs 106 can also acknowledge the responses 414, 418, and 422 via acknowledgements (ACKs) 415, 419, and 423. Multiple paged STAs 106 can contend during the reserved time interval in accordance with various methods, as described herein. In some embodiments, STAs 106 that have not been paged cannot contend during the reserved time interval. Once the reserved time interval is over, STAs 106 can start contending to send the requests to the AP 104. In an embodiment, the AP 104 can determine the duration of the reserved time interval. The reserved time interval should be sufficient for all the paged STAs 106 to send requests to the AP 104 and receive a response from the AP 104. By way of example, and not limitation, the duration of the reserved time interval can be a function of the number of paged STAs 106.

The polling request mechanism 400 illustrates an embodiment in which STAs 402, 404, and 406 can transmit requests, like PS-Polls 412, 416, and 420, to AP 408 in such a way so as to avoid collisions. STAs 402, 404, and 406 can be similar to STAs 106 as described herein. In some embodiments, the STAs 402, 404, and 406 can transmit requests to the AP 408 in a certain order. AP 408 can be similar to AP 104 as described herein. The paging message, such as TIM 409, can implicitly or explicitly define an ordering for the STAs 402, 404, and 406. For example if the TIM 409 bitmap indicates that both STA 402 and STA 404 are paged, then the TIM 409 bitmap also implicitly or explicitly indicates whether STA 402 is before or after STA 404. In an example, the order could be determined by the order in which the paged STAs appear in the bitmap representation. Consider a bitmap {0, 1, 0, 0, 1, 1}, where the STA associated with the bit in position 2 is assumed to be before the STA associated with the bit in position 5. In some implementations, the compressed bitmap can be expressed as list of STA identifiers. In this case the sequence in which the STA identifiers appear in the list can determine the order. Consider the list {13, 25, 5, 22}, where the STA associated with identifier "13" is assumed to come before STA identified by "5." In another aspect, the order can be derived from the value of the STA identifier irrespective of the message representation. In one aspect, the order can be derived from a hash of the STA identifier. In another aspect the order can be derived by one or more Most Significant Bits (MSB) of the STA identifier.

In some implementations, the position of the STA 402, 404, or 406 within the TIM 409 bitmap sequence can be a function of the position of the STA 402, 404, or 406 as described above. The order can further be dependent on other indications, the indications being either included in the paging message or assumed to be known at the STAs 402, 404, and/or 406. For example, the indication can include the Time Stamp Field (TSF) within the paging message (e.g., TIM 409). In such an implementation, the first STA can be the one whose identifier is set to "1" and has a position within the TIM 409 bitmap sequence which is first in the order after the position associated with the 12 least significant bits (LSBs) of the TSF. Many other functions incorporating various indications can be included to achieve a similar result as that based on the Time Stamp Field. In various embodiments, the indications can include, for example, a scrambling seed, a FCS, a CRC, a TIM frame, and/or any hash function of the partial or full content of the packet, including the TIM frames. One beneficial result of including the Time Stamp field in the computation of the order is that the order can be changed at each transmission, provided that the portion of the used Time Stamp Field is different at each transmission.

In some implementations, the sender of the paging message can determine the order of the paged STAs according to any criteria including the usage of the ordering information. For example the sender, AP 408, can order the STAs 402, 404, and 406 based on their QoS requirements, power saving requirements, or other performance parameters. It can be desirable in some implementations for the sender of the paging message to include in the message an explicit indication of the order. This explicit indication of the order may not be based on the TIM 409 bitmap, but rather on other factors as described herein.

In one embodiment, the paging message can include a "time unit multiplier" that can indicate to the STA 106 how many time units to wait before waking up. The STAs 402, 404, and 406 can multiply the time unit multiplier by their ordinal number (starting at zero) within the TIM 409 in order to compute a "wake up time." In an embodiment, the wake up time can be relative to the TIM 409. Therefore, the wake up time can indicate the number of time units, after the TIM 409, which the STAs should wait before waking up. In the illustrated embodiment, the STA 402 has a wake up time at the beginning of the time interval 426. The STA 404 has a wake up time at the beginning of the time interval 432. STA 406 has a wake up time at the beginning of the time interval 438. In various embodiments, the AP 408 can communicate the time unit multiplier in one or more of a beacon, a TIM beacon, the TIM 409, or any other communication. In one embodiment, the STAs 402, 404, and 406 can include a pre-set time unit multiplier.

For illustrative purposes only, and without limitation, FIG. 4 depicts a polling order wherein STA 402 is at the first position in the TIM 409 (position 0), STA 404 is at the second position TIM 409 (position 1), and STA 406 is at the third position TIM 409 (position 2). First the AP 408 transmits the TIM 409. As discussed above, the TIM 409 can indicate that the AP 408 has buffered data ready for the STAs 402, 404, and 406. Moreover, the TIM 409 can indicate the ordering of the STAs 402, 404, and 406, and include the time unit multiplier. The STA 402 can multiply its position 0 by the time unit multiplier to determine that it should wake up immediately after the TIM 409.

At the beginning of the time interval 426, the STA 402 wakes up. Each of STAs 402, 404, and 406 can be configured to defer for a back-off period prior to accessing the medium to send the PS-Poll. The back-off can use a carrier sense multiple access with collision avoidance (CSMA/CA) based medium access procedure, such as the distributed coordination function (DCF) or the enhanced distributed channel access (EDCA) as defined in the IEEE 802.11 standard using the highest priority access configuration (AC) parameters. In an embodiment, prior to back-off the STAs can stay awake for an additional Probe Delay time to sense any ongoing transmissions. In time interval 426, the STA 402 transmits a PS-Poll request 412 to the AP 408. The AP 408 can send the response 414 to the STA 402. The response 414 can include at least a portion of the buffered data addressed to the STA 402. After successfully receiving the response 414, the STA 402 can transmit an ACK 415 to the AP 408. Subsequently, the STA 402 can go back to sleep (or doze), for example until it wakes up again to receive the next TIM.

In certain operation modes, the STA 402 may not wake up at all TIM messages. In these operation modes, the STA 402 may notify the AP that the STA 402 is awake and ready to receive data via the PS-Poll.

At the beginning of the time interval 432, the STA 404 wakes up. The STA 404 can perform the back-off and then transmit a PS-Poll request 416 to the AP 408. The AP 408 can send the response 418 to the STA 404. The response 416 can include at least a portion of the buffered data addressed to the STA 404. After successfully receiving the response 416, the STA 404 can transmit an ACK 419 to the AP 408.

Similarly, at the beginning of the time interval 438, the STA 406 wakes up. The STA 406 can perform the back-off and then transmit a PS-Poll request 420 to the AP 408. The AP 408 can send the response 422 to the STA 406. The response 422 can include at least a portion of the buffered data addressed to the STA 406. After successfully receiving the response 422, the STA 406 can transmit an ACK 423 to the AP 408.

Figure 5A:
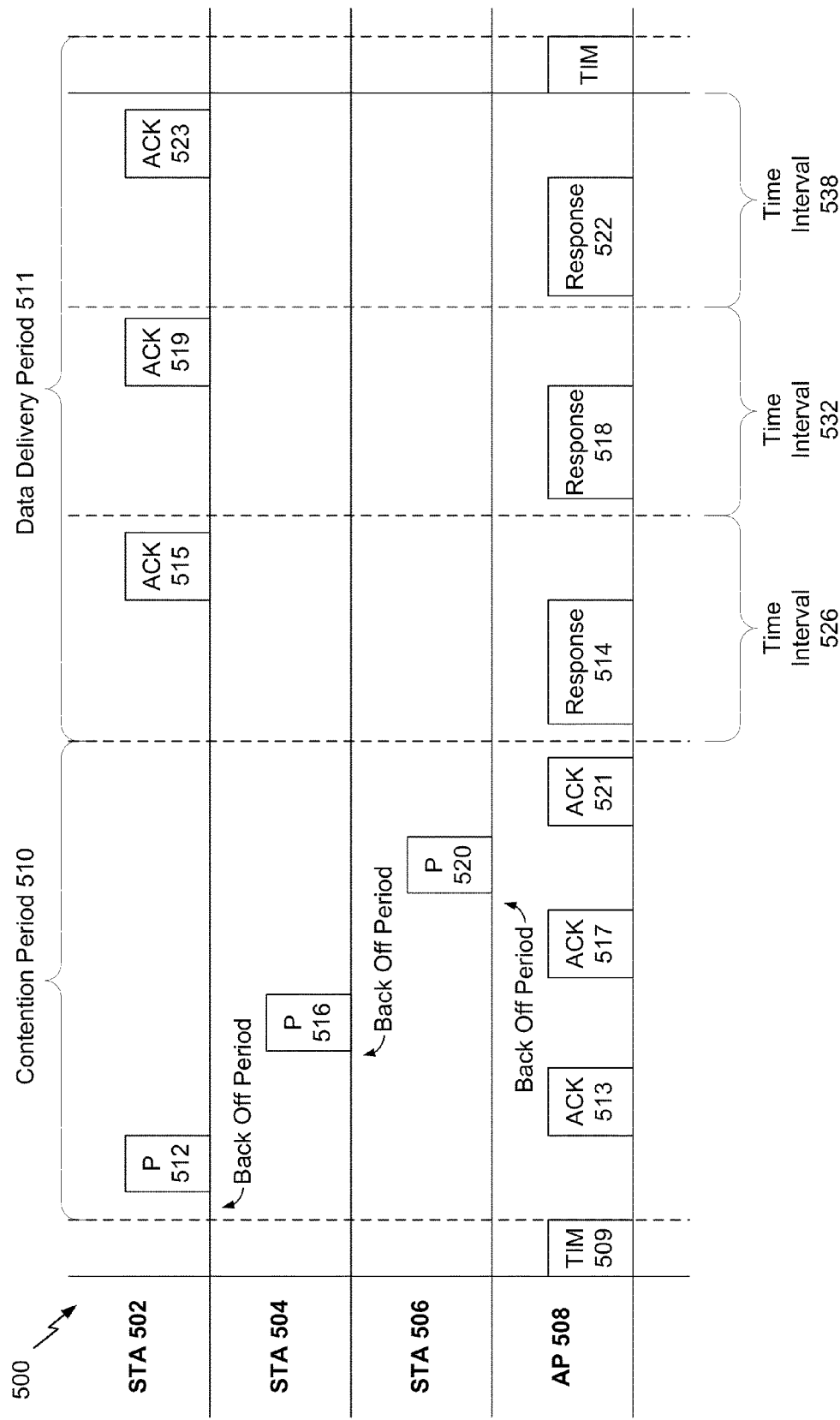
FIG. 5A illustrates another exemplary polling request mechanism.

In an embodiment, the AP 408 can set the NAV for the entire data delivery period 411. In an embodiment, the AP 408 can set a Probe Delay to 0, thereby reducing the wake-up time. In an embodiment, however, it may not be practical to set the NAV for the entire data delivery period 411 or to eliminate the Probe Delay. In another embodiment, another polling request mechanism can be used, wherein the AP 408 does not set the NAV for the entire data delivery period or eliminate the Probe Delay. For example, the wireless communication system 100 can use the polling mechanism described herein with respect to FIGS. 5A-B.

Figure 5B:
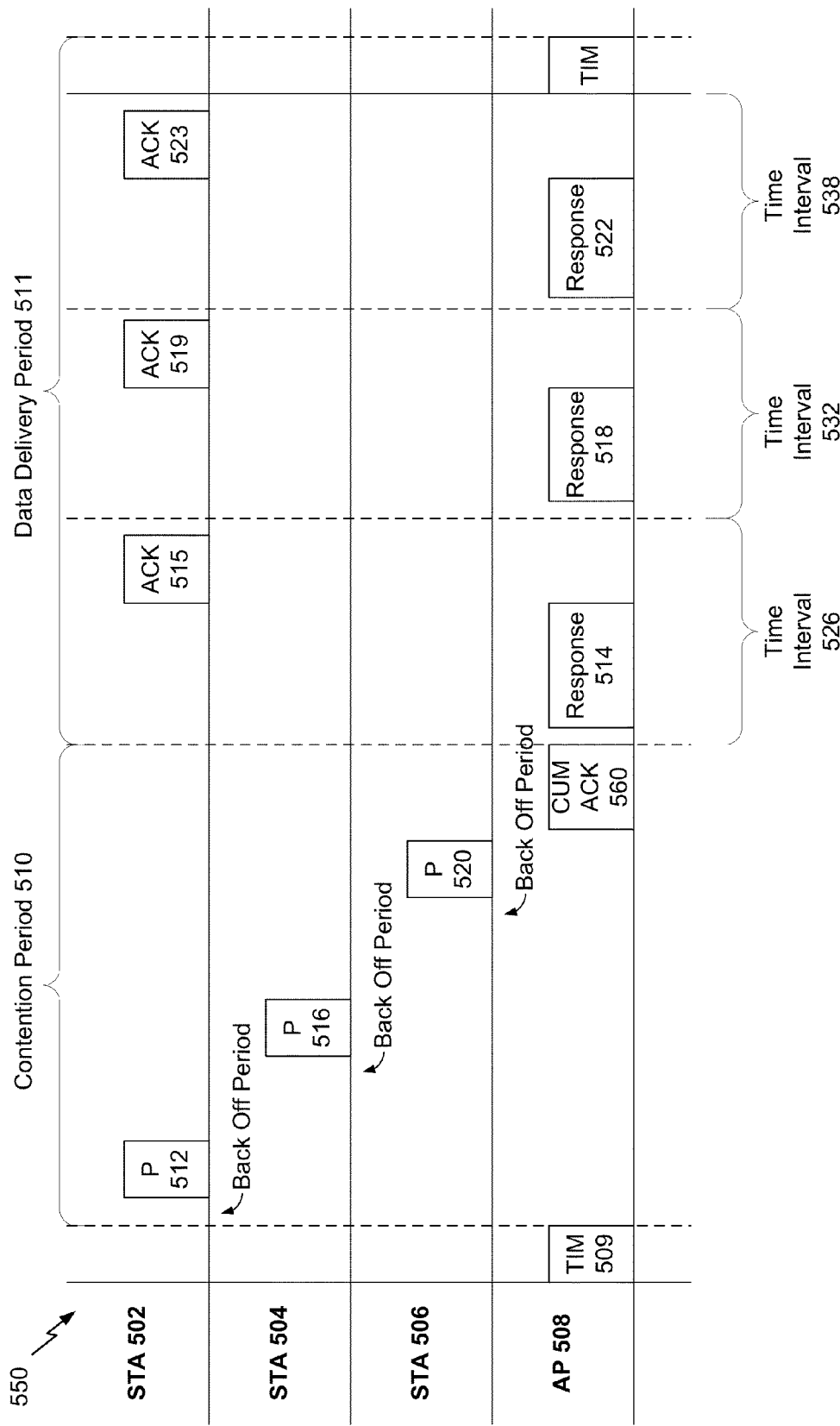
FIG. 5B illustrates another exemplary polling request mechanism.

FIG. 5B illustrates another polling request mechanism 550. The polling request mechanism 550 shown can be used by the AP 104 and the STAs 106 in the wireless communication system 100 of FIG. 1. The polling request mechanism 550 is similar to the polling request mechanism 400 of FIG. 4. However, in the polling request mechanism 550, the TIM interval is divided into two periods: a contention period 510 and a data delivery period 511.

As shown in FIG. 5B, time increases horizontally across the page from the contention period 510 to the data delivery period 511, and within the data delivery period 511 from the time interval 526 to the time interval 538. In an embodiment, the data delivery period 511 can last for an integer multiple of time units (TUs). In an embodiment, each TU can be sufficiently long to allow the AP 508 to perform back-off, send Buffered Units, and receive the ACK from the paged STAs 502, 504, and 506. In one embodiment the AP 508 can include the TU duration in a TIM frame 509. The calculation of the TU by the AP 508 can take into account information regarding the Buffered Units that the AP has to send to the paged STAs. In one embodiment the TU can account for the time to allow the correct transmission of the longest possible BU to the intended paged STAs 502, 504, and 506. In one embodiment, the contention period can be divided into multiple intervals 526, 532, and 538. In an embodiment, the interval duration in the contention period 510 can be calculated to account for the back-off duration, transmission of the PS-Poll and reception of the ACK by a paged STA. In another embodiment the interval duration can be included in the TIM frame 509 by the AP 508. In another embodiment the TU can be the ratio between the time during two consecutive TIM frames and the number of STAs indicated in the first TIM map.

In general, after the transmission of a paging message, such as TIM 509, a time interval is reserved for the paged STAs 106. The reservation can be achieved by transmitting a message (e.g., paging message, additional message) to cause non-paged STAs to defer access to the medium for the duration of the reserved period. In some implementations, the deferred access can be achieved by setting a duration field value of a reserving frame so that non-paged STAs can set their network allocation vector (NAV). Upon reception of a TIM message indicating that the STA is paged, the STA 106 can reset the NAV. In another embodiment, the STA can reset the NAV only when the NAV was set by the same AP 104 that sent out the TIM message. In other implementations, the deferred access can be achieved by sending an additional frame preceding or following the paging frame, where the additional frame indicates the duration of the reserved period. For example, the AP 508 can set the NAV by transmitting a clear-to-send-to-self (CTS-to-self) packet preceding the TIM 509. In an embodiment, the AP 508 can set the NAV to around 20 to 40 ms. In the illustrated embodiment, the deferred access period is the contention period 510.

During the contention period 510, the paged STAs 106 can deterministically send requests to the AP 104 (e.g., Power Saving polls (PS-Poll) requests 512, 516, and 520) and receive an ACK from the AP 104 (e.g., ACKs 513, 517, and 521). Multiple paged STAs 106 can contend during the reserved time interval in accordance with various methods, as described herein. In some embodiments, STAs 106 that have not been paged cannot contend during the reserved time interval. Once the contention period 510 is over, unpaged STAs 106 can start contending to send the requests to the AP 104. In an embodiment, the AP 104 can determine the duration of the contention period 510. The contention period 510 should be sufficient for all the paged STAs 502, 504, and 506 to send requests to the AP 508. By way of example, and not limitation, the duration of the reserved time interval can be a function of the number of paged STAs 502, 504, and 506.

In the illustrated embodiment, the paged STAs 502, 504, and 506 are configured to send the requests 512, 516, and 520 to the AP 508 in a certain order. As in the polling request mechanism 400 (FIG. 4), the paging message, such as TIM 509, can implicitly or explicitly define an ordering for the STAs 502, 504, and 506. For example if the TIM 509 bitmap indicates that both STA 502 and STA 504 are paged, then the TIM 509 bitmap also implicitly or explicitly indicates whether STA 502 is before or after STA 504. In an example, the order could be determined by the order in which the paged STAs appear in the bitmap representation. In some implementations, the compressed bitmap can be expressed as list of STA identifiers. In another aspect, the order can be derived from the value of the STA identifier irrespective of the message representation.

In some implementations, the position of the STA 502, 504, or 506 within the TIM 509 bitmap sequence can be a function of the position of the STA 502, 504, or 506 as described above. The order can further be dependent on other indications, the indications being either included in the paging message or assumed to be known at the STAs 502, 504, and/or 506. For example, the indication can include the Time Stamp Field (TSF) within the paging message (e.g., TIM 509). In such an implementation, the first STA can be the one whose identifier is set to "1" and has a position within the TIM 509 bitmap sequence which is first in the order after the position associated with the 12 least significant bits (LSBs) of the TSF. Many other functions incorporating various indications can be included to achieve a similar result as that based on the TSF. One beneficial result of including the TSF in the computation of the order is that the order can be changed at each transmission, provided that the portion of the used TSF is different at each transmission.

In some implementations, the sender of the paging message can determine the order of the paged STAs according to any criteria including the usage of the ordering information. For example the sender, AP 508, can order the STAs 502, 504, and 506 based on their QoS requirements, power saving requirements, or other performance parameters. It can be desirable in some implementations for the sender of the paging message to include in the message an explicit indication of the order. This explicit indication of the order may not be based on the TIM 509 bitmap, but rather on other factors as described herein.

In one embodiment, the paging message can include a contention "time unit multiplier" that can indicate to the STA 106 how many time units to wait before waking up to send a request during the contention period 510. In one embodiment, the contention time unit multiplier can be implicit (sufficient to allow transmission of the PS-Poll and ACK, and a maximum back-off time) or can be signaled by in another frame sent by the AP 104 to the STAs 106. The STAs 502, 504, and 506 can multiply the contention time unit multiplier by their ordinal number (starting at zero) within the TIM 509 in order to compute a "wake up time." In an embodiment, the wake up time can be relative to the TIM 509. Therefore, the wake up time can indicate the number of time units, after the start of the contention period 510, which the STAs should wait before waking up.

During the data delivery period 511, the paged STAs 106 can receive a response from the AP 104 (e.g., response 514, 518, and 522), and send ACKs to the AP 104 (e.g., ACKs 515, 519, and 523). In one embodiment, the paging message can include a data delivery "time unit multiplier" that can indicate to the STA 106 how many time units to wait before waking up to receive a response during the data delivery period 511. The data delivery time unit multiplier can be different from the contention period time unit multiplier. The STAs 502, 504, and 506 can multiply the data delivery time unit multiplier by their ordinal number (starting at zero) within the TIM 509 in order to compute a "wake up time." In an embodiment, the wake up time can be relative to the TIM 509, to the end of the contention period 510, or to the start of the data delivery period 511. Therefore, the wake up time can indicate the number of time units, after the start of the data delivery period 511, which the STAs should wait before waking up.

In the illustrated embodiment, the STA 502 has a wake up time at the beginning of the time interval 526. The STA 504 has a wake up time at the beginning of the time interval 532. STA 506 has a wake up time at the beginning of the time interval 538. In various embodiments, the AP 508 can communicate the various time unit multipliers in one or more of a beacon, a TIM beacon, the TIM 509, or any other communication. In one embodiment, the STAs 502, 504, and 506 can include pre-set time unit multipliers.

For illustrative purposes only, and without limitation, FIG. 5B depicts a polling order wherein STA 502 is at the first position in the TIM 509 (position 0), STA 504 is at the second position TIM 509 (position 1), and STA 506 is at the third position TIM 509 (position 2). First the AP 508 transmits the TIM 509. As discussed above, the TIM 509 can indicate that the AP 508 has buffered data ready for the STAs 502, 504, and 506. Moreover, the TIM 509 can indicate the ordering of the STAs 502, 504, and 506, and include the time unit multiplier. The STA 502 can multiply its position 0 by the time unit multiplier to determine that it should wake up immediately after the TIM 509.

At the beginning of the contention period 510, the STA 502 wakes up. Each of STAs 502, 504, and 506 can be configured to wait a back-off period. The back-off can use a carrier sense multiple access with collision avoidance (CSMA/CA) based medium access procedure, such as the distributed coordination function (DCF) or the enhanced distributed channel access (EDCA) as defined in the IEEE 802.11 standard. In an embodiment, prior to the back-off, the STAs 502, 504, and 506 can stay awake for an additional Probe Delay time to sense any ongoing transmissions. In another embodiment, the Probe Delay can be eliminated. In time interval 526, the STA 502 transmits a PS-Poll request 512 to the AP 508. The AP 508 can send the ACK 513 to the STA 502. In an embodiment, the ACK 513 can include a specific wake-up time at which the STA 502 should wake up to receive the response 514. In an embodiment, the STA 502 can use the wake-up time included in the ACK 513 instead of computing a wake-up time based on a time unit multiplier. In another aspect, the STAs 502 can indicate its wake-up time to the AP 508 via the request 512. Subsequently, the STA 502 can go back to sleep (or doze), for example until it wakes up again to receive the response 514.

Then, the STA 504 wakes up. The STA 504 can perform the back-off and then transmit a PS-Poll request 516 to the AP 508. The AP 508 can send the ACK 517 to the STA 504. The STA 504 can then sleep or doze until the beginning of time interval 532. Similarly, the STA 506 wakes up. The STA 506 can perform the back-off and then transmit a PS-Poll request 520 to the AP 508. The AP 508 can send the ACK 521 to the STA 506. The STA 506 can then sleep or doze until the beginning of time interval 538. Hence, according to one embodiment of the power saving mechanism described above, the AP 508, which responds to the PS-Poll with an ACK shall not send BUs to any of the STAs 502, 504, 506 before their scheduled wake-up times.

At the beginning of the data delivery period 511, at time interval 526, the STA 502 wakes up. The AP 508 can send the response 514 to the STA 502. The response 514 can include at least a portion of the buffered data addressed to the STA 502. After successfully receiving the response 514, the STA 502 can transmit an ACK 515 to the AP 508. Subsequently, the STA 502 can go back to sleep (or doze), for example until it wakes up again to receive the next TIM.

At the beginning of the time interval 532, the STA 504 wakes up. The AP 508 can send the response 518 to the STA 504. The response 516 can include at least a portion of the buffered data addressed to the STA 504. After successfully receiving the response 516, the STA 504 can transmit an ACK 519 to the AP 508. Similarly, at the beginning of the time interval 538, the STA 506 wakes up. The AP 508 can send the response 522 to the STA 506. The response 522 can include at least a portion of the buffered data addressed to the STA 506. After successfully receiving the response 522, the STA 506 can transmit an ACK 523 to the AP 508.

FIG. 5B illustrates another polling request mechanism 550. The polling request mechanism 550 shown can be used by the AP 104 and the STAs 106 in the wireless communication system 100 of FIG. 1. The polling request mechanism 550 is similar to the polling request mechanism 500 of FIG. 5A. However, in the polling request mechanism 550, the AP 104 does not immediately respond to the PS-Poll 512, 516, and 520. Instead, the AP 104 replies with a cumulative ACK 560 frame, sent at the end of (or after) the contention period 510.

In the illustrated embodiment, during the contention period 510, the paged STAs 106 can send requests to the AP 104 (e.g., Power Saving polls (PS-Poll) requests 512, 516, and 520) and receive a cumulative ACK 560 from the AP 104. The PS-Poll requests 512, 516, and 520 can each indicate whether the AP 104 should respond with an immediate ACK (see FIG. 5A) or the cumulative ACK 560. In various embodiments, the cumulative ACK 560 can include one or more indications, as discussed below.

In one embodiment, the cumulative ACK 560 can contain multiple acknowledging indications, each indicating whether at least one PS-Poll 512, 516, or 520 was received from the STA 106. The STA 106 can belong to a set of STAs. In another embodiment, the acknowledging indications can indicate whether the AP 104 received no PS-Poll 512, 516 from any of the STAs 106 in the set of STA. The methods for representing the multiple acknowledging indications in the cumulative ACK 560 can be same or similar to the methods used to represent the TIM map in a TIM message and can include any method of compressed representation. In particular the representation can implicitly or explicitly define an ordering among the STAs 106. The ordering can be further based on QoS indications sent by the STAs 106 in the PS-Poll.

In one embodiment, the set of STAs can include all the STAs 106 associated with the AP 104. In this embodiment, the acknowledging indications can be a local identifier of the STA 106 or a global identifier (e.g., MAC address) of the STA 106. In another embodiment, the set of STAs can include all the STAs 106 for which the preceding TIM message 509 indicated the existence of a BU intended for that STA 106. In this embodiment, the acknowledging indications can identify the STA 106 within the set of STAs by indicating the position of the STA 106 in the list (or map) of STAs for which the AP 104 has a BU, as indicated by the preceding TIM message 509.

In another embodiment, the set of STAs can include all the STAs 106 for which the preceding TIM message 509 was intended to provide an indication that the AP 104 has a BU for the STA 106. In this embodiment, the acknowledging indications can identify the STA 106 within the set of STAs for which the TIM 509 provided indication of both a present or absent BU, by indicating the position of the STA 106 as provided in the preceding TIM message 509.

In one embodiment, cumulative ACK 560 can include an indication associated with each of the time intervals 526, 532, and 538. The indication of the time intervals 526, 532, and 538 for a STA 106 can based on the position of the acknowledging indication for STA 106, the position being determined based on ordering defined by the method of representation of the multiple acknowledging indications. The time intervals can be further dependent on a Time Unit indication included in the same Cumulative ACK. In another embodiment, the cumulative ACK 560 can contain an identifier that identifies the corresponding TIM message to which the acknowledgement indications refer. The identifier can include one or more of the sequence number, Time Stamp Field, and an alternative identifier of the management frame carrying the corresponding TIM message.

In an embodiment, the AP 104 can send the cumulative ACK 109 at the end of the protected poll interval 510. In another embodiment, the AP 104 can send the cumulative ACK 560 at a time indication included in the TIM message 509. In another embodiment, the AP 104 can send the cumulative ACK 560 at the time where the next TIM message is expected for the set of STAs. Accordingly, the STAs can wake up only at the time where a TIM message is expected, instead of waking up at distinct times for receiving the TIM message and the cumulative ACK 560. In this embodiment the cumulative ACK 560 can acknowledge the reception of PS-Polls 512, 516, and 520 sent in response to the previous TIM message. Moreover, the AP 104 can send the cumulative ACK 560 as a frame immediately before or after the TIM element. In another embodiment, the AP 104 can send the cumulative ACK 560 in the same frame as the TIM message 509. In one embodiment, the cumulative ACK 560 can be an Information Element.

Figure 6:
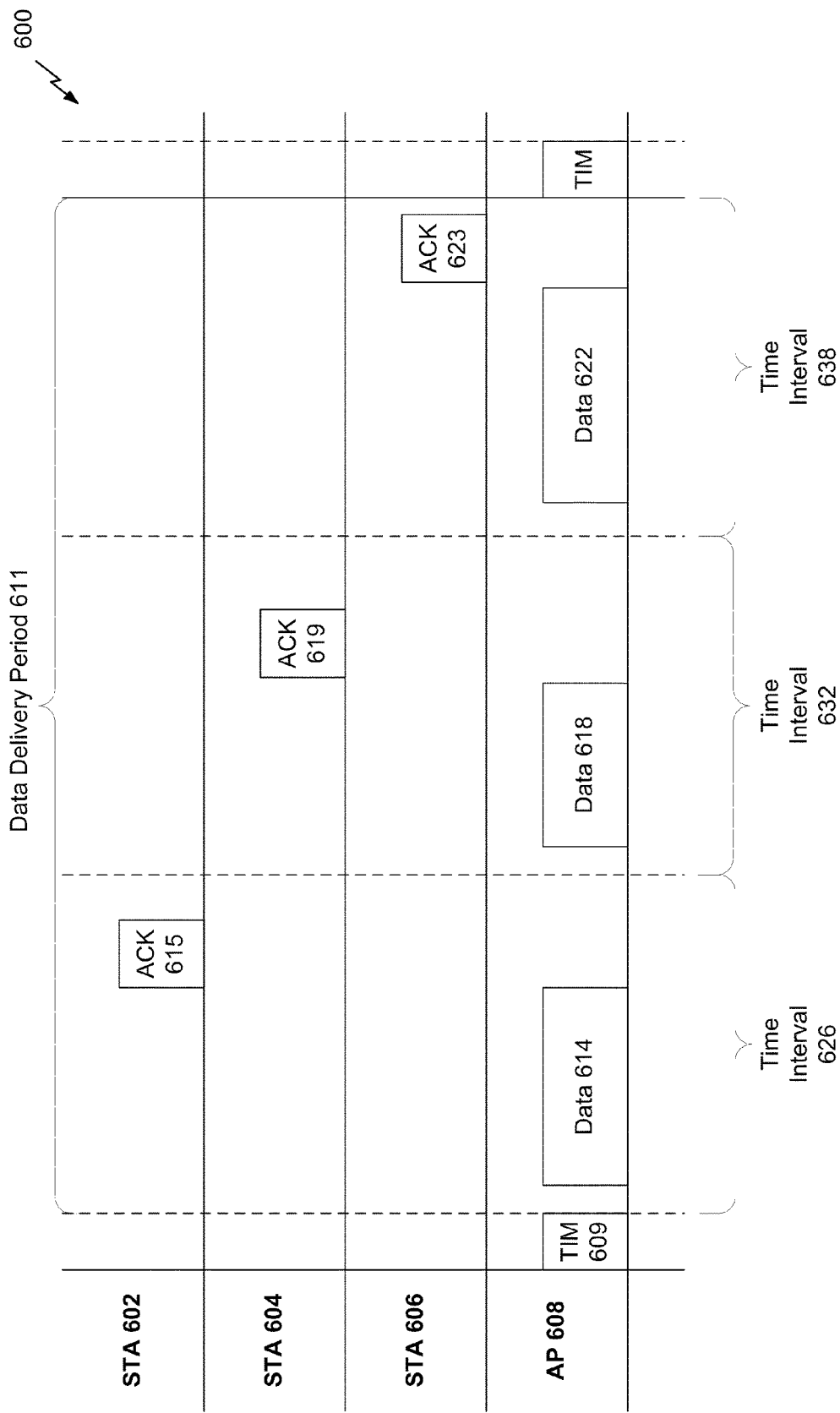
FIG. 6 illustrates an exemplary non-polling mechanism.

FIG. 6 illustrates an exemplary non-polling mechanism 600. The non-polling mechanism 600 shown can be used by the AP 104 and the STAs 106 in the wireless communication system 100 of FIG. 1. The non-polling mechanism 600 is similar to the polling request mechanism 400 of FIG. 4. However, in the polling request mechanism 600, the STAs 602, 604, and 606 do not send requests such as the requests 412, 416, and 420 shown in FIG. 4. Instead, the STAs 602, 604, and 606 wake up at the appropriate time to receive the data 614, 618, and 622. In an embodiment, the wireless communication system 100 can operate according to the non-polling mechanism 600 in situations where, for example, the full TIM indication map is sent across multiple fragments at different times, so that the paging information for a STA 602, 604, or 606 is present only in some of the fragments. In addition, the AP 608 can command the paged STAs 602, 604, and 606 to be awake at their designated wake up times. Note that if the AP 608 can safely assume the STA 602, 604, or 606 is awake at designated time, the STA 602, 604, or 606 need not send a PS-Poll to the AP 608 to notify that it is awake. A STA 602, 604, or 606 operating in this operation mode does not send PS-Poll to AP 608.

The polling request mechanism 600 illustrates an embodiment in which STAs 602, 604, and 606 can receive the data 614, 618, and 622 without sending requests such as PS-Polls so as to avoid collisions. STAs 602, 604, and 606 can be similar to STAs 106 as described herein. In some embodiments, the STAs 602, 604, and 606 can receive data from the AP 608 in a certain order. AP 608 can be similar to AP 104 as described herein. The paging message, such as TIM 609, can implicitly or explicitly define an ordering for the STAs 602, 604, and 606. For example if the TIM 609 bitmap indicates that both STA 602 and STA 604 are paged, then the TIM 609 bitmap also implicitly or explicitly indicates whether STA 602 is before or after STA 604. In an example, the order could be determined by the order in which the paged STAs appear in the bitmap representation. In some implementations, the compressed bitmap can be expressed as list of STA identifiers. In this case the sequence in which the STA identifiers appear in the list can determine the order. In another aspect, the order can be derived from the value of the STA identifier irrespective of the message representation.

In some implementations, the position of the STA 602, 604, or 606 within the TIM 609 bitmap sequence can be a function of the position of the STA 602, 604, or 606 as described above. The order can be further dependent on other indications, the indications being either included in the paging message or assumed to be known at the STAs 602, 604, and/or 606. For example, the indication can include the Time Stamp Field (TSF) within the paging message (e.g., TIM 609). In such an implementation, the first STA can be the one whose identifier is set to "1" and has a position within the TIM 609 bitmap sequence which is first in the order after the position associated with the 12 least significant bits (LSBs) of the TSF. Many other functions incorporating various indications can be included to achieve a similar result as that based on the TSF. One beneficial result of including the TSF in the computation of the order is that the order can be changed at each transmission, provided that the portion of the used TSF is different at each transmission.

In some implementations, the sender of the paging message can determine the order of the paged STAs according to any criteria including the usage of the ordering information. For example the sender, AP 608, can order the STAs 602, 604, and 606 based on their QoS requirements, power saving requirements, or other performance parameters. It can be desirable in some implementations for the sender of the paging message to include in the message an explicit indication of the order. This explicit indication of the order may not be based on the TIM 609 bitmap, but rather on other factors as described herein.

In one embodiment, the paging message can include a "time unit multiplier" that can indicate to the STA 106 how many time units to wait before waking up. The STAs 602, 604, and 606 can multiply the time unit multiplier by their ordinal number (starting at zero) within the TIM 609 in order to compute a "wake up time." In one embodiment, the time unit multiplier can be equal to a beacon period divided by a total number of TIM bits set. In one embodiment, the STAs 602, 604, and 606 can determine their order in a rotating manner. For example, the STAs 602, 604, and 606 can calculate their order in the transmission sequence (j) as $j=(i+tsf) \mod n$, where I is the order in the TIM, tsf is the value of a TSF field in the TIM frame, and n is the total number of TIM bits that are set.

In an embodiment, the wake up time can be relative to the TIM 609. Therefore, the wake up time can indicate the number of time units, after the TIM 609, which the STAs should wait before waking up. In the illustrated embodiment, the STA 602 has a wake up time at the beginning of the time interval 626. The STA 604 has a wake up time at the beginning of the time interval 632. STA 606 has a wake up time at the beginning of the time interval 638. In various embodiments, the AP 608 can communicate the time unit multiplier in one or more of a beacon, a TIM beacon, the TIM 609, or any other communication. In one embodiment, the STAs 602, 604, and 606 can include a pre-set time unit multiplier.

For illustrative purposes only, and without limitation, FIG. 6 depicts a data transmission order wherein STA 602 is at the first position in the TIM 609 (position 0), STA 604 is at the second position TIM 609 (position 1), and STA 606 is at the third position TIM 609 (position 2). First the AP 608 transmits the TIM 609. As discussed above, the TIM 609 can indicate that the AP 608 has buffered data ready for the STAs 602, 604, and 606. Moreover, the TIM 609 can indicate the ordering of the STAs 602, 604, and 606, and include the time unit multiplier. The STA 602 can multiply it's position 0 by the time unit multiplier to determine that it should wake up immediately after the TIM 609.

At the beginning of the time interval 626, the STA 602 wakes up. The AP 608 can send the data 614 to the STA 602. The response 614 can include at least a portion of the buffered data addressed to the STA 602. After successfully receiving the data 614, the STA 602 can transmit an ACK 615 to the AP 608. Subsequently, the STA 602 can go back to sleep (or doze), for example until it wakes up again to receive the next TIM.

At the beginning of the time interval 632, the STA 604 wakes up. The AP 608 can send the data 618 to the STA 604. The response 616 can include at least a portion of the buffered data addressed to the STA 604. After successfully receiving the data 616, the STA 604 can transmit an ACK 619 to the AP 608.

Similarly, at the beginning of the time interval 638, the STA 606 wakes up. The AP 608 can send the data 622 to the STA 606. The response 622 can include at least a portion of the buffered data addressed to the STA 606. After successfully receiving the data 622, the STA 606 can transmit an ACK 623 to the AP 608.

In an embodiment, the wireless communication system 100 can be configured to selectively operate using two or more of the polling request mechanism 400, the polling request mechanism 550, and the polling request mechanism 600. For example, the AP 104 can include one or more indication bits in the TIM frame setting an operation mode. In one embodiment, the AP 104 can implicitly communicate the operation mode. For example, all paged STAs 106 can stay awake for the first PS-Poll/request exchange. If the AP responds to the first request with an ACK, then the paged STAs 106 can operate according to the polling request mechanism 550. Otherwise, the STAs 106 can operate according to the polling request mechanism 400, for example.

In various embodiments, the wireless communication system 100 can be configured to jointly operate using two or more of the polling request mechanism 400, the polling request mechanism 550, the non-polling mechanism 600, and another polling request mechanism. For example, the STAs 106 can communicate to the AP 104 which mechanism they are going to use. The AP can set parameters in accordance with the mechanism selected by the STAs 106.

For example, in one embodiment, the STA 106 can indicate to the AP 104 which power save operation mode it is going to use by sending a message included in a management frame such as association request or a probe request. In one embodiment, a 1 or 2 bit indication can be included in an Information Element that indicates a capability of the STA 106 (such as, for example, HT Capabilities, VHT Capabilities, and/or Extended Capabilities), or that indicates an operating parameter of the STA 106 (such as, for example, a HT Operating element and/or a VHT operating element).

In one embodiment, the AP 104 can accept the operating mode indicated by the STA 106 and operate accordingly. In another embodiment, the AP 104 can deny association STAs 106 indicating a particular operating mode. In one embodiment the AP 104 can indicate allowed operation modes in beacon frames, probe response frames, and/or association response frames.

Figure 7:
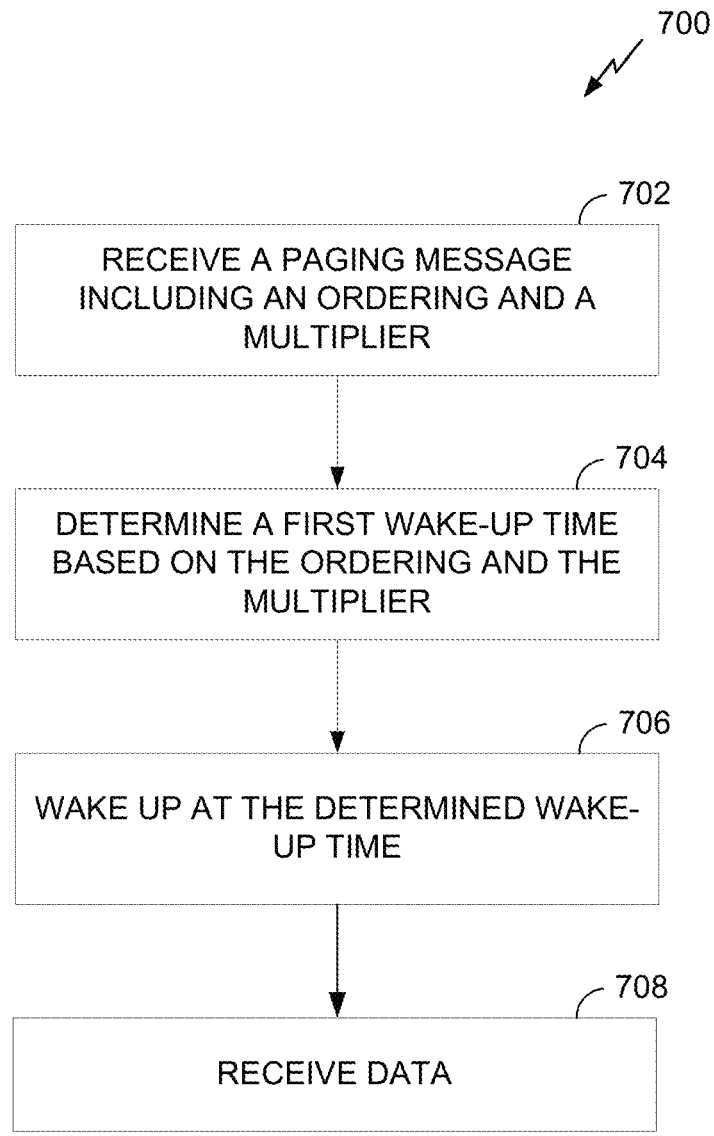
FIG. 7 is a flowchart of a process for reducing collisions in the wireless communication system of FIG. 1.

FIG. 7 is a flowchart of a process 700 for reducing collisions in the wireless communications system of FIG. 1. Although the method of flowchart 700 is described herein with reference to the device 202 discussed above with respect to FIG. 2, a person having ordinary skill in the art will appreciate that the method of flowchart 700 can be implemented by any other suitable device. In an embodiment, the steps in flowchart 700 can be performed by the processor 204 in conjunction with the transmitter 210, the receiver 212, and the memory 206. Although the method of flowchart 700 is described herein with reference to a particular order, in various embodiments, blocks herein can be performed in a different order, or omitted, and additional blocks can be added.

First, at block 702, the wireless device 202 receives a paging message from the AP 104, via the receiver 212. As discussed above with respect to FIGS. 4-6, the paging message can include an ordering and a multiplier. In an embodiment, the wireless device 202 can receive the ordering and/or the multiplier from another communication, or the values can be preset.

Next, at block 704, the wireless device 202 determines a first wake-up time based on the ordering and the multiplier. For example, the processor 204 can determine the order of the wireless device 202 within a TIM. The processor 204 can multiply the order (which can start at zero) by the multiplier. The result can be the wake-up time, in time units after receipt of the TIM. The wireless device 202 can sleep or dose until the determined wake-up time.

Then, at block 706, the wireless device 202 can wake-up. In an embodiment, the wireless device 202 can transmit a request for data, as discussed above with respect to FIGS. 4 and 5. In one embodiment, as discussed above with respect to FIGS. 5A-B, the wireless device 202 can receive an acknowledgement to the request for data, and go back to sleep until another wake-up time at which time data will be received. In another embodiment, the wireless device 202 does not transmit a request for data, as discussed above with respect to FIG. 6.

Finally, at block 708, the wireless device receives the data from the AP 104. In an embodiment, the wireless device 202 can send an acknowledgement to the AP 104. The data can be all or part of data buffered at the AP 104, and addressed to the wireless device 202.

Figure 8:
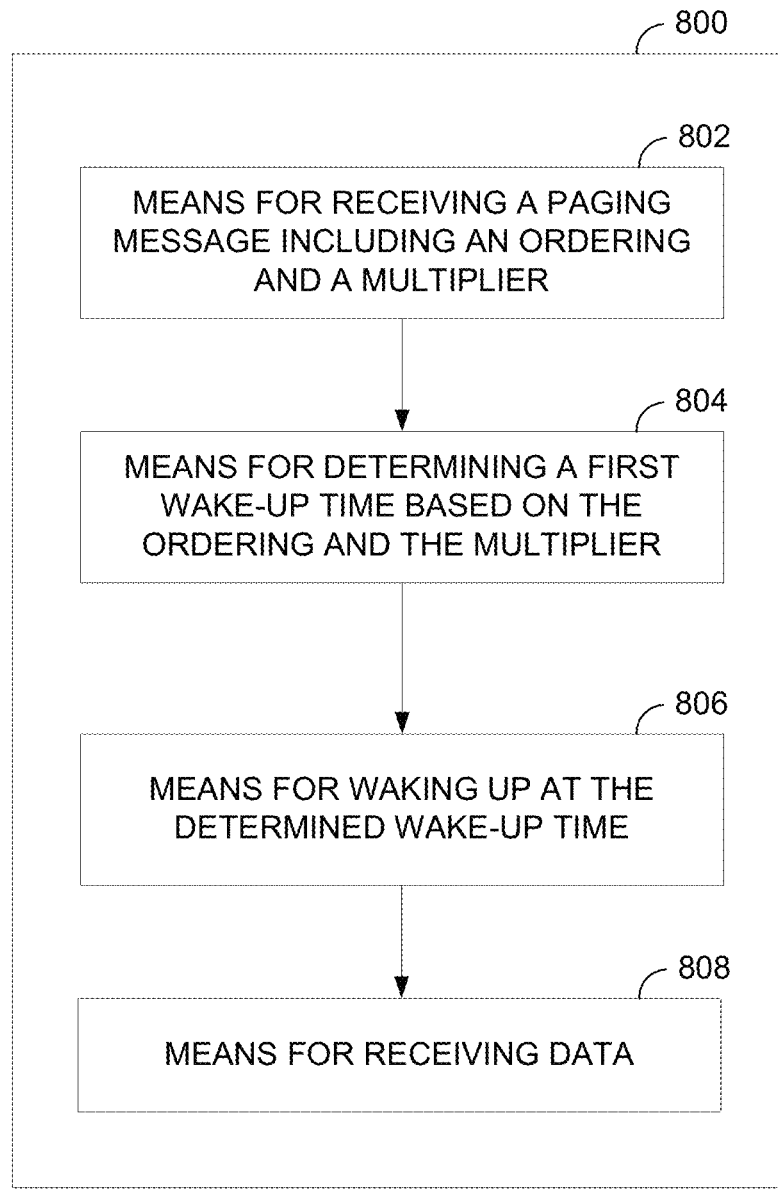
FIG. 8 is a functional block diagram of an exemplary wireless device that can be employed within the wireless communication system of FIG. 1.

FIG. 8 is a functional block diagram of an exemplary wireless device 800 that can be employed within the wireless communication system 100. The device 800 comprises means 802 for receiving a paging message including an ordering and a multiplier, means 804 for determining a first wake-up time based on the ordering and the multiplier, means 806 for waking up at the determining wake-up time, and means 808 for receiving data.

The means 802 for receiving a paging message including an ordering and a multiplier can be configured to perform one or more of the functions discussed above with respect to the block 702 illustrated in FIG. 7. The means 802 for receiving a paging message including an ordering and a multiplier can correspond to one or more of the receiver 212, the processor 204, the transceiver 214, and the memory 206, discussed above with respect to FIG. 2. The means 804 for determining a first wake-up time based on the ordering and the multiplier can be configured to perform one or more of the functions discussed above with respect to the block 804 illustrated in FIG. 7. The means 804 for determining a first wake-up time based on the ordering and the multiplier can correspond to one or more of the processor 204 and the memory 206, discussed above with respect to FIG. 2.

The means 806 for waking up at the determining wake-up time can be configured to perform one or more of the functions discussed above with respect to the block 706 illustrated in FIG. 7. The means 806 for waking up at the determining wake-up time can correspond to one or more of the receiver 212, the processor 204, the transceiver 214, and the memory 206, discussed above with respect to FIG. 2. The means 808 for receiving data can be configured to perform one or more of the functions discussed above with respect to the block 708 illustrated in FIG. 7. The means 808 for receiving data can correspond to one or more of the receiver 212, the processor 204, the transceiver 214, and the memory 206, discussed above with respect to FIG. 2.

As used herein, the term "determining" encompasses a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like. Further, a "channel width" as used herein can encompass or can also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium can include non-transitory computer readable medium (e.g., tangible media). In addition, in some aspects computer readable medium can include transitory computer readable medium (e.g., a signal). Combinations of the above should also be included within the scope of computer-readable media.

The methods disclosed herein include one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

The functions described can be implemented in hardware, software, firmware or any combination thereof. If implemented in software, the functions can be stored as one or more instructions on a computer-readable medium. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects can include a computer program product for performing the operations presented herein. For example, such a computer program product can include a computer readable medium having instructions stored (and/or encoded) thereon, the instructions being executable by one or more processors to perform the operations described herein. For certain aspects, the computer program product can include packaging material.

Software or instructions can also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations can be made in the arrangement, operation and details of the methods and apparatus described above without departing from the scope of the claims.

While the foregoing is directed to aspects of the present disclosure, other and further aspects of the disclosure can be devised without departing from the basic scope thereof, and the scope thereof is determined by the claims that follow.

What is claimed is:

1. A method for reducing collisions in a wireless communications network, the method comprising:
 receiving, at a wireless device, a paging message comprising an ordering and a multiplier;
 determining a first wake-up time based on the ordering and the multiplier;
 waking up at the determined wake-up time; and
 receiving data.

2. The method of claim 1, wherein the multiplier indicates a multiple of time units comprising a ratio between a time during two consecutive TIM frames and a number of stations indicated in the first TIM frame of the two consecutive TIM frames.

3. The method of claim 1, wherein the multiplier indicates a multiple of time units comprising a ratio between a data delivery period and a number of stations indicated in the TIM frame.

4. The method of claim 1, wherein the ordering is based on a hash of a station identifier.

5. The method of claim 1, wherein the ordering is based one or more most significant bits of a station identifier.

6. The method of claim 1, further comprising transmitting a request for the data.

7. The method of claim 6, further comprising:
 determining a second wake-up time;
 waking up at the determined second wake-up time; and
 receiving an acknowledgement to the request for data,
 wherein the second wake-up time is earlier than the first wake-up time.

8. The method of claim 7, wherein the acknowledgement comprises a cumulative acknowledgement.

9. The method of claim 7, wherein determining the first wake-up time comprises determining the first wake-up time based on the acknowledgement.

10. The method of claim 7, wherein determining the first wake-up time comprises determining the first wake-up time based on the ordering and the multiplier.

11. The method of claim 7, wherein the request for data comprises the determined first wake-up time.

12. The method of claim 7, wherein the second wake-up time is during a contention period, and the first wake-up time is during a data delivery period.

13. The method of claim 12, further comprising setting a network allocation vector during the contention period.

14. The method of claim 13, further comprising determining to ignore the network allocation vector set during the contention period.

15. The method in claim 14, wherein ignoring the network allocation vector is based on an indication in the TIM paging.

16. The method of claim 1, further comprising transmitting an acknowledgement of the data.

17. The method of claim 1, further comprising waiting a back-off period.

18. The method of claim 1, further comprising transmitting an operating mode selection.

19. A wireless device configured to reduce collisions in a wireless communications network, the wireless device comprising:
 a receiver configured to receive a paging message comprising an ordering and a multiplier;
 a processor configured to:
  determine a first wake-up time based on the ordering and the multiplier;
  wake up at the determined wake-up time; and
  receive data.

20. The wireless device of claim 19, wherein the multiplier indicates a multiple of time units comprising a ratio between a time during two consecutive TIM frames and a number of stations indicated in the first TIM frame of the two consecutive TIM frames.

21. The wireless device of claim 19, wherein the multiplier indicates a multiple of time units comprising a ratio between a data delivery period and a number of stations indicated in the TIM frame.

22. The wireless device of claim 19, wherein the ordering is based on a hash of a station identifier.

23. The wireless device of claim 19, wherein the ordering is based one or more most significant bits of a station identifier.

24. The wireless device of claim 19, further comprising a transmitter configured to transmit a request for the data.

25. The wireless device of claim 24, wherein the processor is further configured to:
 determine a second wake-up time; and
 wake up at the determined second wake-up time,
 wherein the receiver is further configured to receive an acknowledgement to the request for data, and
 the second wake-up time is earlier than the first wake-up time.

26. The wireless device of claim 25, wherein the acknowledgement comprises a cumulative acknowledgement.

27. The wireless device of claim 25, wherein the processor is configured to determine the first wake-up time based on the acknowledgement.

28. The wireless device of claim 25, wherein the processor is configured to determine the first wake-up time based on the ordering and the multiplier.

29. The wireless device of claim 25, wherein the request for data comprises the determined first wake-up time.

30. The wireless device of claim 25, wherein the second wake-up time is during a contention period, and the first wake-up time is during a data delivery period.

31. The wireless device of claim 30, wherein the receiver is configured to receive a network allocation vector during the contention period.

32. The wireless device of claim 31, wherein the processor is configured to determine to ignore the network allocation vector set during the contention period.

33. The wireless device in claim 32, wherein ignoring the network allocation vector is based on an indication in the TIM paging.

34. The wireless device of claim 19, further comprising a transmitter configured to transmit an acknowledgement of the data.

35. The wireless device of claim 19, wherein the processor is further configured to wait a back-off period.

36. The wireless device of claim 19, further comprising a transmitter configured to transmit an operating mode selection.

37. An apparatus for reducing collisions in a wireless communications network,
 the apparatus comprising:
 means for receiving a paging message comprising an ordering and a multiplier;

means for determining a first wake-up time based on the ordering and the multiplier;
means for waking up at the determined wake-up time; and
means for receiving data.

38. The apparatus of claim 37, wherein the multiplier indicates a multiple of time units comprising a ratio between a time during two consecutive TIM frames and a number of stations indicated in the first TIM frame of the two consecutive TIM frames.

39. The apparatus of claim 37, wherein the multiplier indicates a multiple of time units comprising a ratio between a data delivery period and a number of stations indicated in the TIM frame.

40. The apparatus of claim 37, wherein the ordering is based on a hash of a station identifier.

41. The apparatus of claim 37, wherein the ordering is based one or more most significant bits of a station identifier.

42. The apparatus of claim 37, further comprising means for transmitting a request for the data.

43. The apparatus of claim 42, further comprising:
means for determining a second wake-up time;
means for waking up at the determined second wake-up time; and
means for receiving an acknowledgement to the request for data,
wherein the second wake-up time is earlier than the first wake-up time.

44. The apparatus of claim 43, wherein the acknowledgement comprises a cumulative acknowledgement.

45. The apparatus of claim 43, wherein means for determining the first wake-up time comprises means for determining the first wake-up time based on the acknowledgement.

46. The apparatus of claim 43, wherein means for determining the first wake-up time comprises means for determining the first wake-up time based on the ordering and the multiplier.

47. The apparatus of claim 43, wherein the request for data comprises the determined first wake-up time.

48. The apparatus of claim 43, wherein the second wake-up time is during a contention period, and the first wake-up time is during a data delivery period.

49. The apparatus of claim 48, further comprising means for setting a network allocation vector during the contention period.

50. The apparatus of claim 49, further comprising means for determining to ignore the network allocation vector set during the contention period.

51. The apparatus in claim 50, wherein ignoring the network allocation vector is based on an indication in the TIM paging.

52. The apparatus of claim 37, further comprising means for transmitting an acknowledgement of the data.

53. The apparatus of claim 37, further comprising means for waiting a back-off period.

54. The apparatus of claim 37, further comprising means for transmitting an operating mode selection.

55. A non-transitory computer-readable medium comprising code that, when executed by one or more processors, causes an apparatus to:
receive a paging message comprising an ordering and a multiplier;
determine a first wake-up time based on the ordering and the multiplier;
wake up at the determined wake-up time; and
receive data.

56. The medium of claim 55, wherein the multiplier indicates a multiple of time units comprising a ratio between a time during two consecutive TIM frames and a number of stations indicated in the first TIM frame of the two consecutive TIM frames.

57. The medium of claim 55, wherein the multiplier indicates a multiple of time units comprising a ratio between a data delivery period and a number of stations indicated in the TIM frame.

58. The medium of claim 55, wherein the ordering is based on a hash of a station identifier.

59. The medium of claim 55, wherein the ordering is based one or more most significant bits of a station identifier.

60. The medium of claim 55, further comprising code that, when executed by one or more processors, causes the apparatus to transmit a request for the data.

61. The medium of claim 60, further comprising code that, when executed by one or more processors, causes the apparatus to:
determine a second wake-up time;
wake up at the determined second wake-up time; and
receive an acknowledgement to the request for data,
wherein the second wake-up time is earlier than the first wake-up time.

62. The medium of claim 61, wherein the acknowledgement comprises a cumulative acknowledgement.

63. The medium of claim 61, further comprising code that, when executed by one or more processors, causes the apparatus to determine the first wake-up time based on the acknowledgement.

64. The medium of claim 61, further comprising code that, when executed by one or more processors, causes the apparatus to determine the first wake-up time based on the ordering and the multiplier.

65. The medium of claim 61, wherein the request for data comprises the determined first wake-up time.

66. The medium of claim 61, wherein the second wake-up time is during a contention period, and the first wake-up time is during a data delivery period.

67. The medium of claim 66, further comprising code that, when executed by one or more processors, causes the apparatus to set a network allocation vector during the contention period.

68. The medium of claim 67, further comprising code that, when executed by one or more processors, causes the apparatus to determine to ignore the network allocation vector set during the contention period.

69. The medium in claim 68, wherein ignoring the network allocation vector is based on an indication in the TIM paging.

70. The medium of claim 55, further comprising further comprising code that, when executed by one or more processors, causes the apparatus to transmit an acknowledgement of the data.

71. The medium of claim 55, further comprising code that, when executed by one or more processors, causes the apparatus to wait a back-off period.

72. The medium of claim 55, further comprising code that, when executed by one or more processors, causes the apparatus to transmit an operating mode selection.

* * * * *